Figure 1:
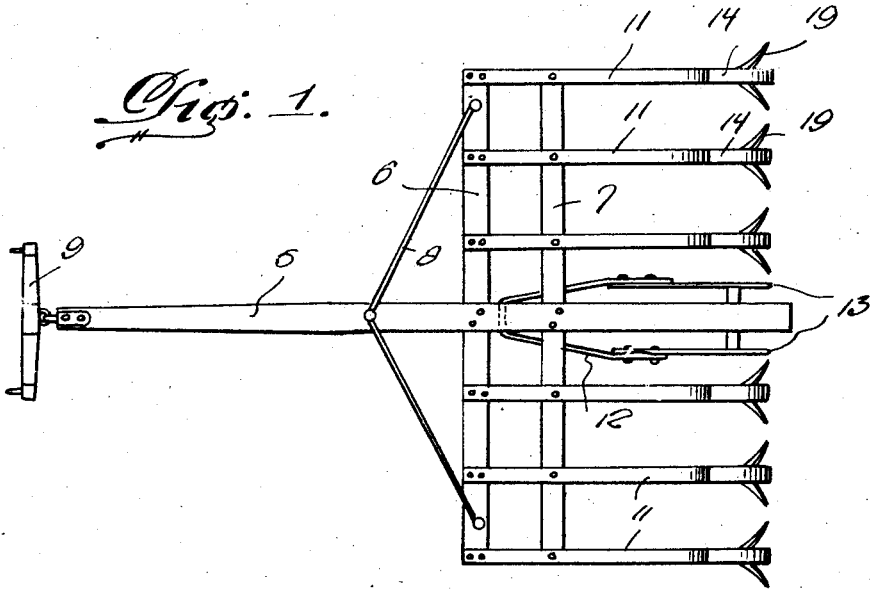

Nov. 23, 1926.

L. F. HAYNES 1,607,889

ATTACHMENT FOR CULTIVATORS

Filed March 19, 1926

Inventor
L. F. Haynes,

By Clarence A O'Brien
Attorney

Patented Nov. 23, 1926.

1,607,889

UNITED STATES PATENT OFFICE.

LEONARD F. HAYNES, OF ATLANTA, TEXAS.

ATTACHMENT FOR CULTIVATORS.

Application filed March 19, 1926. Serial No. 95,944.

The present invention relates to attachment for cultivators and has for its object to provide a device of this nature which will greatly assist in the cultivating process wherein the harrow teeth break the crust of the earth or soil and the attachment throws the loose soil on the roots of the little plants and leaves them clear of grass and weeds.

Another important object of the invention is to provide an attachment of this nature which may be easily attached to and detached from a harrow tooth.

A still further very important object of the invention is to provide an attachment of this nature which is simple and inexpensive in its construction, efficient and reliable in use, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
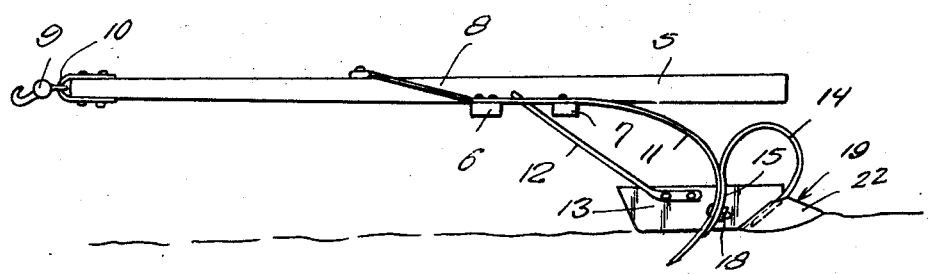
Figure 3:
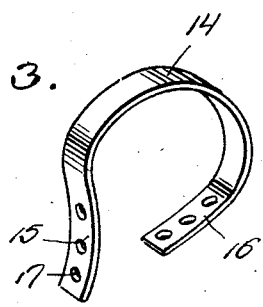
Figure 4:
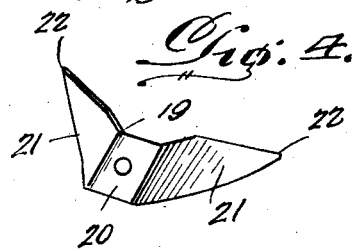

Figure 1 is a top plan view of a harrow showing my attachment mounted on the teeth thereof, and Figure 2 is a side elevation thereof, and Figure 3 is a perspective view of the oxbow spring of one attachment, and Figure 4 is a perspective view of the sweep thereof.

Referring to the drawing in detail, it will be seen that 5 denotes the longitudinal beam of the harrow which has fixed thereto a pair of transverse beams 6 and 7, the former of which is braced by rods 8 to the longitudinal beam 5. A single whiffle tree 9 is suitably attached to the forward end of the beam 5 as at 10. The usual or any preferred form of any harrow teeth 11 are attached to the cross beams 6 and 7. These teeth 7 are curved downwardly and rearwardly and then curved downwardly and forwardly, as clearly illustrated in Figure 2. A U-rod 12 has its bight portion engaged with the beam 5 and its sides extending downwardly and rearwardly and attached to box fenders 13 which are disposed in parallel spaced co-extension.

Any number of my improved attachments may be used with the form of harrow just described. As all the attachments are identical in formation, only one will be described in detail. The numeral 14 denotes an oxbow spring having one end 15 eccentrically curved in relation to the curvature of the spring and the other end 16 straight and inclined forwardly and downwardly toward the end 15 to be angularly disposed in relation thereto. The end 15 is apertured as at 17 for the reception of a fastening element such as bolts 18, so that the end 15 may be detachably fastened to the rear of one of the teeth 11 as is clearly shown in Figure 2. A heel sweep is designated generally by the numeral 19 and includes a bight portion 20 adapted to be fastened in any suitable manner to the end 16, and wings 21 which extend rearwardly and are diverged outwardly from each other terminating in points as is indicated at 22.

The sweeps 19 are disposed to extend back of the teeth. The box fenders are used when plowing small plants. In using the device, the fenders extend back to the sweeps as is clearly shown in Figure 1, but the center teeth may be left off. The horse or other draft animal walks on top of the row but when there is a poor plant of cotton two animals may be used by replacing a single tree 9 for any well known double tree structure. The harrow teeth break the crust while the sweeps throw the loose soil on the roots of the little plants and leave them clear of grass and weeds. When plowing plants the first time, it is preferable to use two sweeps, one at each side with all the other teeth, but at the second plowing use all the sweeps with the fenders left off. When the land is stumpy and rough, a skooter stock may be used. The end 15 would be attached to the skooter stock.

The present embodiment of the invention with the harrow has been illustrated merely by way of example since in actual practice it attains the features of advantage enumerated as desirable in the statement of the invention and the above description.

It will be apparent, however, that numerous changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. An attachment of the class described including a spring having an ox-bow body, a terminal on one end of the body reversely curved to the body and adapted to be fixed to the rear of a harrow tooth, a terminal on the other end of the body, said last mentioned terminal being straight and inclined forwardly and downwardly to be disposed at an angle to the first terminal, and a heel sweep atttached to the second terminal.

2. An attachment of the class described including a spring having an ox-bow body, a terminal on one end of the body reversely curved to the body and adapted to be fixed to the rear of the harrow tooth, a terminal on the other end of the body, said last mentioned terminal being straight and inclined forwardly and downwardly to be disposed at an angle to the first terminal, a heel sweep attached to the second terminal, said heel sweep including a bight portion and a pair of side wings diverging outwardly and rearwardly.

3. In combination, a harrow including a plurality of teeth, a plurality of ox-bow springs each having a front terminal engaged with the rear of each tooth and a rear terminal slanting downwardly and forwardly, and a heel sweep attached to each rear terminal.

4. In combination, a harrow including a plurality of teeth, a plurality of ox-bow springs each having a front terminal engaged with the rear of each tooth and a rear terminal slanting downwardly and forwardly, a heel sweep attached to each rear terminal, each heel sweeep including a bight portion and a pair of diverging rearwardly extending side wings terminating in points.

In testimony whereof I affix my signature.

LEONARD F. HAYNES.